US009516218B1

United States Patent
Tohidi (10) Patent No.: US 9,516,218 B1
(45) Date of Patent: Dec. 6, 2016

(54) GROUPING DIGITAL IMAGES BASED ON DETECTED OBJECTS

(71) Applicant: Google Inc., Mountain View, CA (US)

(72) Inventor: Maryam Tohidi, San Francisco, CA (US)

(73) Assignee: GOOGLE INC., Mountain View, CA (US)

( * ) Notice: Subject to any disclaimer, the term of this patent is extended or adjusted under 35 U.S.C. 154(b) by 186 days.

(21) Appl. No.: 14/174,836

(22) Filed: Feb. 6, 2014

(51) Int. Cl.
  *G06K 9/00* (2006.01)
  *H04N 5/232* (2006.01)

(52) U.S. Cl.
  CPC ................. *H04N 5/23222* (2013.01)

(58) Field of Classification Search
  None
  See application file for complete search history.

(56) References Cited

U.S. PATENT DOCUMENTS

| 8,503,787 B2 | 8/2013 | Boncyk et al. |
| 8,553,949 B2 | 10/2013 | Steinberg et al. |
| 2012/0229657 A1* | 9/2012 | Calman ................. G06Q 50/01 348/207.1 |
| 2013/0046648 A1* | 2/2013 | Calman ................. G06Q 30/08 705/26.3 |
| 2013/0329943 A1 | 12/2013 | Chritopulos et al. |
| 2014/0129394 A1* | 5/2014 | Oliver ............... G06Q 30/0643 705/27.2 |

\* cited by examiner

*Primary Examiner* — David F Dunphy
(74) *Attorney, Agent, or Firm* — Johnson, Marcou & Isaacs, LLC (57) ABSTRACT

A user captures images on a user computing device. The user signs in to an application, which transmits the user's images to an account management system, which recognizes objects within the images and assigns one or more object categories to the images and recognizes multiple images comprising objects in a common object category. After receiving user consent, the application groups the images on the user computing device according to object category. The user computing device captures an image of another object. The application transmits the image to the account management system, which detects objects within the image, identifies the object category, and saves the image to the corresponding object category group on the user computing device. After receiving user consent, the account management system finds information for each image in the object category group of images and transmits the information to the user computing device.

14 Claims, 7 Drawing Sheets

GROUPING DIGITAL IMAGES BASED ON DETECTED OBJECTS

TECHNICAL FIELD

The present disclosure relates generally to managing digital images, and more particularly to organizing digital images based on objects detected in images.

BACKGROUND

Mobile user computing devices are convenient image capturing devices. Often, a user captures an image or series of images on a mobile device for later reference when the user is interested in purchasing a product or obtaining information. For example, a user might go to several merchant locations and look at similar items of a certain type. The user might capture images of one or more of the items of interest using a mobile device. At a later time, the user reviews the images when determining which of the products the user wants to purchase or further investigate.

Conventional technologies do not allow the detection of objects in images to group the images by object category and provide information about each image in an object category group.

SUMMARY

In certain example aspects described herein, a computer-implemented method to group images captured on a user computing device by object category and provide information about each image in an object category group is provided. In an example embodiment, a user captures images on a user computing device by accessing a camera module on the user computing device. The user signs in to an application and the application transmits the user's images to an account management system over a network. In an optional embodiment, the images are transmitted along with location data and time stamp data logged by the user computing device. The account management system recognizes objects within the images and assigns one or more object categories to the images. The account management system recognizes multiple images comprising objects in a common object category and the application requests user permission to group the images. In an example embodiment, the user consents to group the images and the application groups the images on the user computing device according to object category.

In an example embodiment, the user computing device captures an image of an object having the same object category as assigned to a group of images on the user computing device. The user computing device may log location data and time stamp data for the image. The application transmits the image, the location data, and time stamp data to the account management system, which identifies the object category of detected objects in the image. The account management system saves the image to the corresponding object category group on the user computing device. The application requests user consent for the account management system to search for information relating to images in the object category group. In an example embodiment, the user consents and the account management system locates information based on the object category and/or location data for each image in the group of images and transmits the information to the user computing device.

In certain other example aspects described herein, a system and a computer program product to group images captured on a user computing device by object category and provide information about each image in an object category group are provided.

These and other aspects, objects, features, and advantages of the example embodiments will become apparent to those having ordinary skill in the art upon consideration of the following detailed description of illustrated example embodiments.

DETAILED DESCRIPTION OF EXAMPLE EMBODIMENTS

Overview

The example embodiments described herein provide methods and systems for grouping images captured on a user computing device by object category and providing information about each image in an image group.

In an example embodiment, a user captures images comprising objects within one or more object categories on a user computing device. An account management system receives the images over a network via an application resident on the user computing device, detects objects within the images, and assigns the images to object category groups based on the detected objects. The application, upon user consent, groups the images in the object category groups on the user computing device based on the determination of the account management system. The account management system, if the user gives consent, may search for information corresponding to each image of an object category group and transmit such information to the user computing device for the user to view.

In an example embodiment, a user accesses a camera module on a user computing device and captures several images of desired objects. In an optional embodiment, the user computing device logs location data and a time stamp for each captured image. The images are saved on a user computing device. The user signs in to an application. The application transmits the user's images to an account management system along with any time stamp data and location data associated with each image. The account management system recognizes objects within the images. The account management system assigns one or more object categories to objects within the images. The account management system recognizes multiple images comprising objects in a common object category. For example, the object category may comprise an event (such as a trip to the beach), food, artwork, receipts, recipes, furniture, electronics, or any other suitable object category. The application requests user permission to group the multiple images comprising objects in a common object category.

In an example embodiment, the user consents permission for the application to group the images. The application groups the images. The user computing device captures an image of an object having the same object category as assigned to a group of images on the user computing device. The user computing device may log location data and time stamp data for the image. The application transmits the image and any corresponding location data and time stamp data to the account management system. The account management system identifies the object category of objects in the image. The account management system saves the image to the corresponding object category on the user computing device.

In an example embodiment, the application requests user consent for the account management system to search for information relating to images in the object category group. In an example embodiment, the user consents, and the account management system finds information based on object category and/or location data for each image in the group of images. The account management system transmits the information to the user computing device.

Example System Architecture

Turning now to the drawings, in which like numerals indicate like (but not necessarily identical) elements throughout the figures, example embodiments are described in detail.

Figure 1:
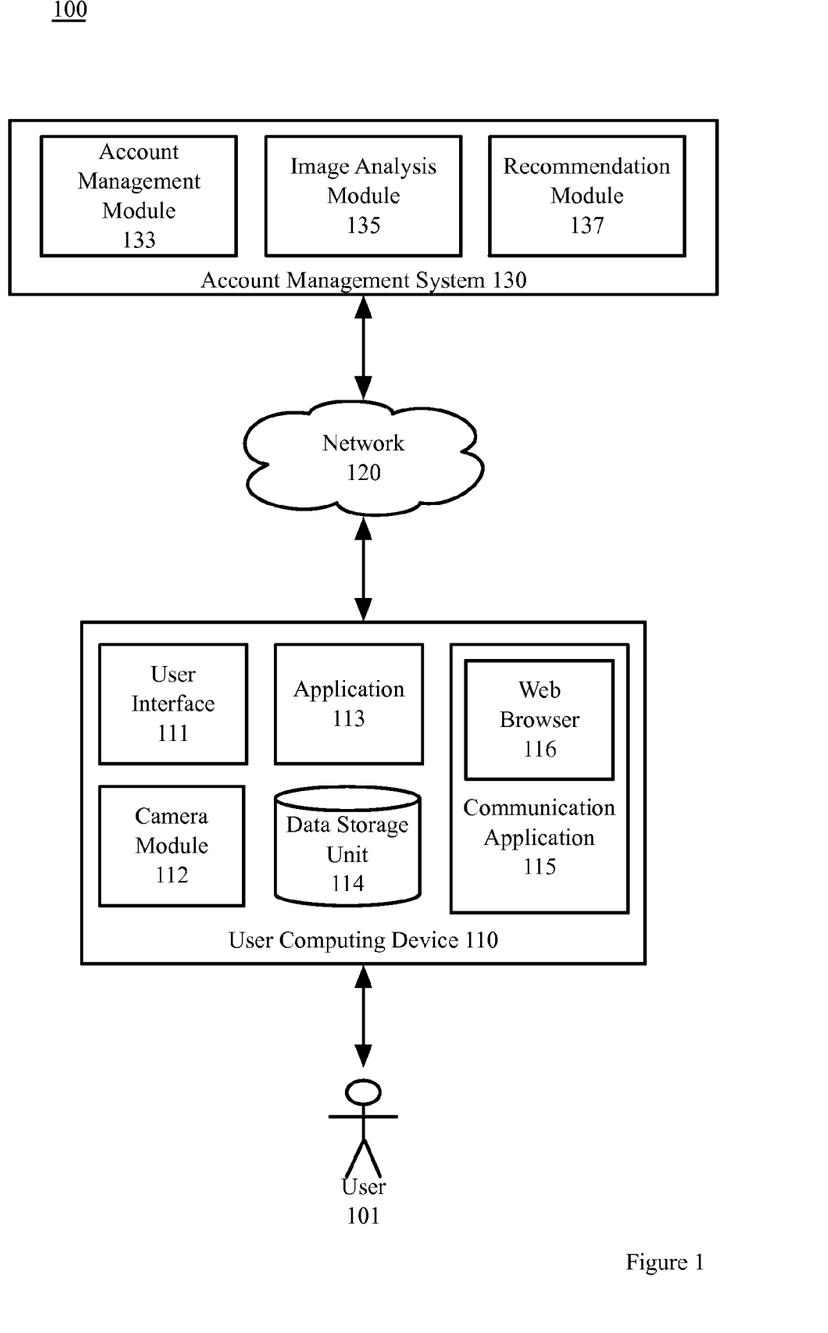
FIG. 1 is a block diagram depicting a system for grouping images captured on a user computing device by object category and providing information about each image in an object category group, in accordance with certain example embodiments.

FIG. 1 is a block diagram depicting a system 100 for grouping images captured by a user computing device 110 by object category, in accordance with certain example embodiments. As depicted in FIG. 1, the system 100 includes network computing devices 110 and 130 that are configured to communicate with one another via one or more networks 120. In some embodiments, a user 101 associated with a device must install an application and/or make a feature selection to obtain the benefits of the techniques described herein.

For example, the network 120 can include a local area network ("LAN"), a wide area network ("WAN"), an intranet, an Internet, storage area network ("SAN"), personal area network ("PAN"), a metropolitan area network ("MAN"), a wireless local area network ("WLAN"), a virtual private network ("VPN"), a cellular or other mobile communication network, Bluetooth, NFC, or any combination thereof or any other appropriate architecture or system that facilitates the communication of signals, data, and/or messages. Throughout the discussion of example embodiments, it should be understood that the terms "data" and "information" are used interchangeably herein to refer to text, images, audio, video, or any other form of information that can exist in a computer-based environment.

Each network computing device 110 and 130 includes a device having a communication module capable of transmitting and receiving data over the network 120. For example, each network computing device 110 and 130 can include a server, desktop computer, laptop computer, tablet computer, a television with one or more processors embedded therein and/or coupled thereto, smart phone, handheld computer, personal digital assistant ("PDA"), or any other wired or wireless, processor-driven device. In the example embodiment depicted in FIG. 1, the network computing devices 110 and 130 are operated by users 101 and account management system operators (not depicted), respectively.

An example user computing device 110 comprises a user interface 111, a camera module 112, an application 113, a data storage unit 114, a communication application 115 and a web browser 116. In an example embodiment, the user interface 111 enables a user 101 to interact with the camera module 112, application 113, data storage unit 114 and/or web browser 116. In an example embodiment, the user 101 controls the camera module 112 via the user interface 111 to capture an image. In an example embodiment, the user 101 consents to a request by the application 113 to group images and/or find information relating to a group of images by actuating a user interface 111 object.

In an example embodiment, the camera module 112 may be any module or function of the user computing device 110 that obtains a digital image. The camera module 112 may be resident on the user computing device 110 or in any manner logically connected to the user computing device 110. For example, the camera module 112 may be connected to the user computing device 110 via the network 120. The camera module 112 may be capable of obtaining individual images or a video scan. Any other suitable image capturing device may be represented by the camera module 112.

In an example embodiment, the application 113 is a program, function, routine, applet, or similar entity that exists on and performs its operations on the user computing device 110. In certain embodiments, the user 101 must install the application 113 and/or make a feature selection on the user computing device 110 to obtain the benefits of the techniques described herein. In an example embodiment, the user 101 may access the application 113 on the user computing device 110 via a user interface 111. In another example embodiment, the user accesses the authorized application 113 through the web browser 116 or other suitable means of access. In an example embodiment, the application 113 is an application that requires the user 101 to sign in or in any other suitable manner to log in. In an example embodiment, the application 113 is associated with the account management system 130. In an example embodiment, the user 101 accesses an application distribution site and downloads the application 113 onto the user computing device 110. In an example embodiment, the application 113 enables the user 101 to interact with or control the camera module 112 or to view captured images stored in the data storage unit 114. In an example embodiment, the application 113 enables the user 101 to view information gathered by the account management system 130 associated with a group of images in the same object category captured by the user computing device 110. In an example embodiment, the user 101 grants permission for the account management system 130 to view the user's 101 images captured on the user computing device 110 by enabling a setting on the application 113.

In an example embodiment, the data storage unit 114 can include any local or remote data storage structure accessible to the user computing device 110 suitable for storing information. In an example embodiment, the data storage unit 114 stores encrypted information, such as HTML5 local storage. In an example embodiment, the data storage unit 114 is used to store images captured by the camera module 112. In an example embodiment, the application 113 accesses the data storage unit 114 to extract the captured images on the user computing device 110 to transmit to the account management system 130.

In an example embodiment, the user 101 can use a communication application 112, such as a web browser 116 application or a stand-alone application 113, to view, download, upload, or otherwise access documents or web pages via a distributed network 120.

In an example embodiment, the communication application 115 can interact with web servers or other computing devices connected to the network 120, including the user computing device 110 and a web server (not depicted) of the account management system 130.

In an example embodiment, the web browser 116 can enable the user 101 to interact with web pages using the user computing device 110. In an example embodiment, the web browser 114 enables the user 101 to access and/or sign in to the user's account management system 130 account. In an example embodiment, the web browser 116 also enables the user 101 to view information obtained by the account management system 130 concerning images captured by the user computing device 110 pertaining to a common object category.

An example account management system 130 comprises an account management module 133, an image analysis module 135, and a recommendation module 137. In an example embodiment, the user 101 has an account with the account management system 130. In an example embodiment, the account management module 133 manages the user's 101 account. For example, the account management module 133 may receive a user's 101 username and password and allow the user 101 to sign in and access services provided by the account management system 130. In an example embodiment, the account management module 133 communicates with the application 113 resident on the user computing device 110. In another example embodiment, the account management module communicates with the user 101 via the user computing device web browser 116. In an example embodiment, the account management module 133 recognizes when a user 101 enables a setting on the user's account management system 130 account that allows the account management system 130 to access images on the user computing device 110.

In an example embodiment, the image analysis module 135 receives images captured by the user computing device 110. In an example embodiment, the image analysis module 135 receives the images from the application 113 resident on the user computing device 110. In an example embodiment, the image analysis module 135 detects objects within images received from the user computing device 110 or user computing device application 113. In an example embodiment, the image analysis module 135 assigns one or more categories to an image based on objects detected within the image. In an example embodiment, the image analysis module 135, if a user 101 consents, groups one or more images having an object category in common.

In an example embodiment, when the user 101 consents, the recommendation module 137 finds information for each image of a group of images having a commonly assigned object category. In an example embodiment, the recommendation module 137 searches the account management system 130 for information related to the images. In another example embodiment, the recommendation module 137 searches for information via a search engine over the network 120. In an example embodiment, the recommendation module 137 communicates with the user computing device 110. In an example embodiment, the account management system 130 transmits information related to each image of the group of images having a commonly assigned object category to the user computing device 110. In another example embodiment, the recommendation module 137 displays the information on an account management system 130 web site (not depicted) that the user 101 can access via the user computing device web browser 116.

It will be appreciated that the network connections shown are example and other means of establishing a communications link between the computers and devices can be used. Moreover, those having ordinary skill in the art having the benefit of the present disclosure will appreciate that the user computing device 110 and the account management system 130 illustrated in FIG. 1 can have any of several other suitable computer system configurations. For example, a user computing device 110 embodied as a mobile phone or handheld computer may or may not include all the components described above.

Example Processes

The example methods illustrated in FIGS. 2-6 are described hereinafter with respect to the components of the example operating environment 100. The example methods of FIG. 2-6 may also be performed with other systems and in other environments.

Figure 2:
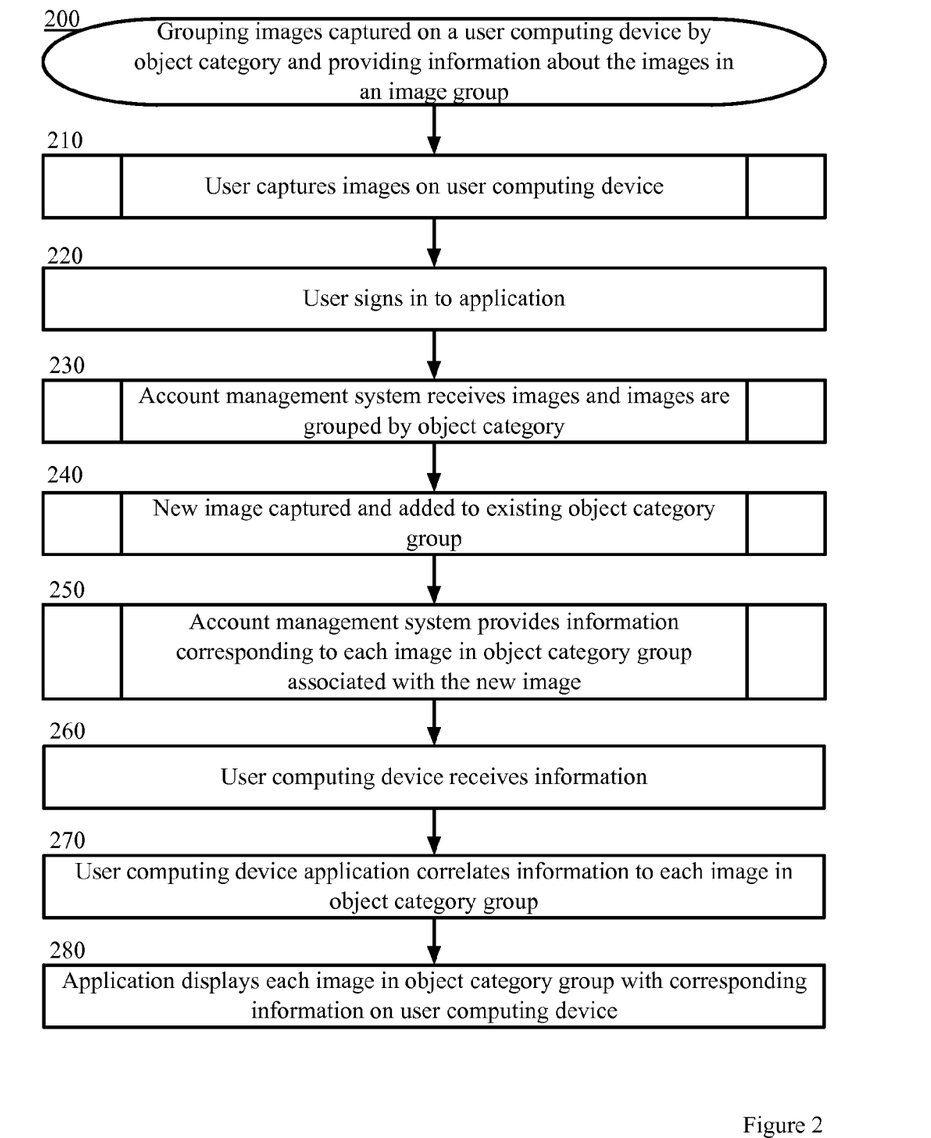
FIG. 2 is a block flow diagram depicting a method for grouping images captured on a user computing device by object category and providing information about each image in an object category group, in accordance with certain example embodiments.

FIG. 2 is a block diagram depicting a method 200 for grouping images captured on a user computing device 110 by object category and providing information about each image in an image group, in accordance with certain example embodiments. The method 200 is described with reference to the components illustrated in FIG. 1.

In block 210, the user 101 captures images on the user computing device 110. The method for capturing images on a user computing device 110 is described in more detail hereinafter with reference to the methods described in FIG. 3.

Figure 3:
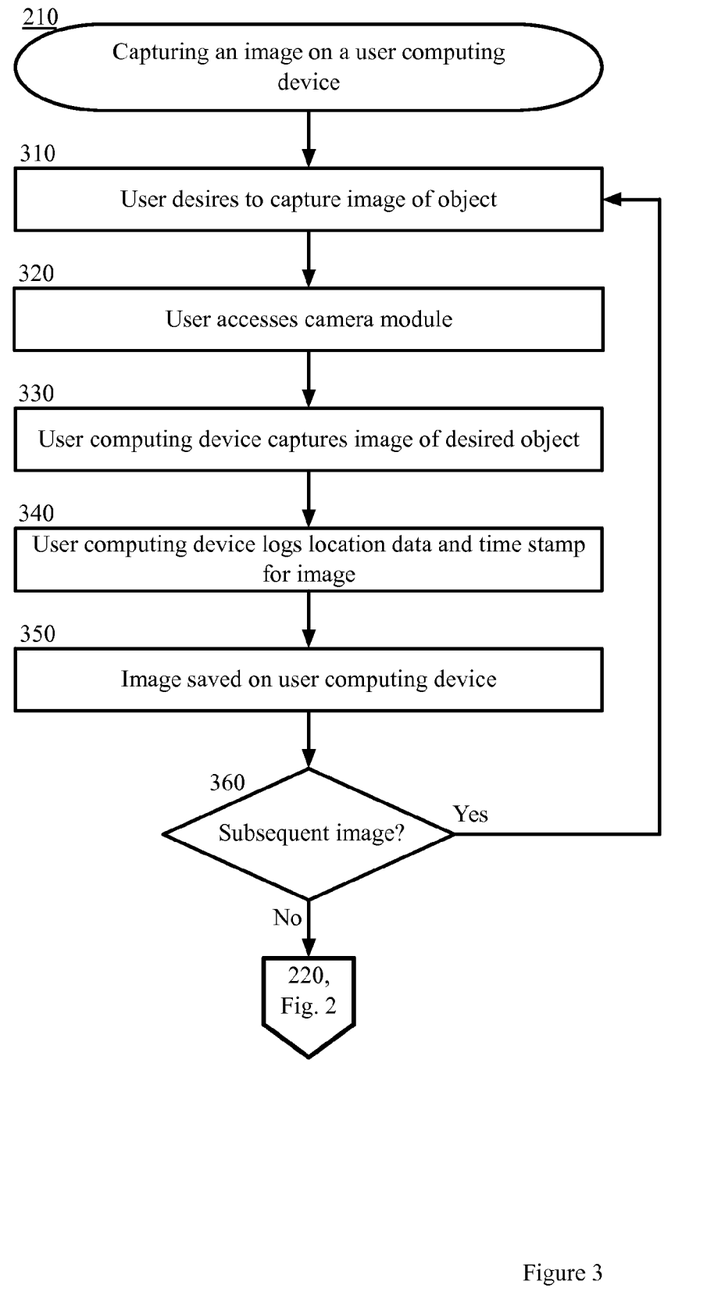
FIG. 3 is a block flow diagram depicting a method for capturing an image on a user computing device, in accordance with certain example embodiments.

FIG. 3 is a block flow diagram depicting a method 210 for capturing an image on a user computing device 110, in accordance with certain example embodiments, as referenced in block 210. The method 210 is described with reference to the components illustrated in FIG. 1.

In block 310, the user 101 desires to capture an image of an object. For example, the user 101 is in a store and is interested in buying a product. The user 101 desires to capture several images of the product and/or competing similar products. In another example, the user 101 is at a friend's house and is impressed with a kitchen appliance and desires to capture an image.

In block 320, the user 101 accesses the camera module 112. In an example embodiment, the user 101 accesses the camera module 112 resident on a mobile user computing device 110 via the user interface 111. For example, the user 101 selects the camera module 112 on a mobile phone using a touch screen interface. In an example embodiment, the camera module 112 is not resident on the user computing device 110 but is accessible to the user computing device 110 via a network 120 connection. For example, the user 101 downloads images from a camera or other memory over network 120 to the user computing device 110.

In block 330, the user computing device 110 captures the image of the desired object. In an example embodiment, the user 101 changes settings on the camera module 112 and/or the user computing device 110 before capturing the image.

For example, the user 101 activates the flash setting on the camera module 112 under low light conditions. In another example embodiment, the user 101 captures multiple images of the desired object. In yet another example embodiment, the user 101 records a video of the desired object using the user computing device camera module 112.

In an optional embodiment, in block 340, the user computing device 110 logs location data and a time stamp for the image. In an example embodiment, the user computing device 110 utilizes an input from the global positioning system (GPS) to log the approximate longitude and latitude of the user computing device 110. In another example embodiment, the user computing device 110 uses an input from another satellite-based positioning system to log the location data. In yet another example embodiment, the user computing device 110 calculates a distance of the user computing device 110 from the nearest radio towers or cell towers to determine its position. In an example embodiment, the user computing device 110 correlates the location with an address. For example, the user computing device 110 enters the location in a mapping application 113 on the user computing device 110 or transmits the location to the account management system 130 to receive an address associated with the location. In an example embodiment, the time stamp comprises one or more of the current month, day, year, era, time zone, hour of the day, minutes of the hour, and seconds of the minute. For example, a time stamp comprises 9:30 a.m. ET, Dec. 27, 2013. In certain example embodiments, the location and/or the timestamp are not recorded. For example, the user 101 has not enabled the user computing device's 110 ability to log location data or time stamp data. In another example, the user 101 has not granted permission for the user computing device 110 to log the location data or time stamp data.

In block 350, the image is saved on the user computing device 110. In an example embodiment, the image is saved in the data storage unit 114. In an example embodiment, the application 113 can access the data storage unit 114 for the user 101 to review saved images. In another example embodiment, the image is saved on another device accessible by the user computing device 110 over a network 120, such as in a cloud computing environment.

In block 360, the user 101 decides whether to capture a subsequent image. In an example embodiment, a significant amount of time may have passed and/or the user may be in a different location from the location in which the previous image was captured. In another example embodiment, the user 101 decides to capture a subsequent image on the user computing device 110 after the previous image is captured.

In an example embodiment, if the user 101 decides to capture a subsequent image, the method 210 proceeds to block 310, where the user 101 desires to capture an image of an object, the user 101 accesses the camera module 112, the user computing device 110 captures an image of the desired object, the user computing device 110 logs the location data and a time stamp for the image, and the image is saved on the user computing device 110. In an example embodiment, one or more of these steps to capture a subsequent image on the user computing device 110 may not be necessary. For example, the user may already have the camera module 112 or camera application 113 open on the user computing device 110 when the user 101 decides to capture a subsequent image.

Returning to block 360, if the user 101 decides not to take a subsequent image, the method 200 proceeds to block 220 in FIG. 2. The method 210 can be performed multiple times and at different times, in which case multiple images can be captured by the user computing device 110.

Returning to FIG. 2, in block 220, the user 101 signs in to the application 113. In an example embodiment, the application 113 is associated with and managed by the account management system 130. In this example embodiment, functions described as being performed by the application 113 may also be performed by the account management system 130. Functions described as being performed by the account management system 130 may also be performed by the application 113. In an example embodiment, the application 113 allows the user 101 to view and/or organize images captured by the user computing device 110. In an example embodiment, the user 101 accesses the application 113 directly on the user computing device 110. In another example embodiment, the user 101 accesses the application 113 using the web browser 116 of the user computing device. In an example embodiment, signing in to the application 113 comprises entering a user 101 name and password and/or actuating a user interface 111 object. For example, the user 101 enters a user 101 name and password and selects an object that is labeled "sign in."

In block 230, the account management system 130 identifies objects in the images and the images are grouped by object category. The method for identifying objects in images, assigning object categories to images, and grouping images together according to object category on a user computing device 110 is described in more detail hereinafter with reference to the methods described in FIG. 4.

Figure 4:
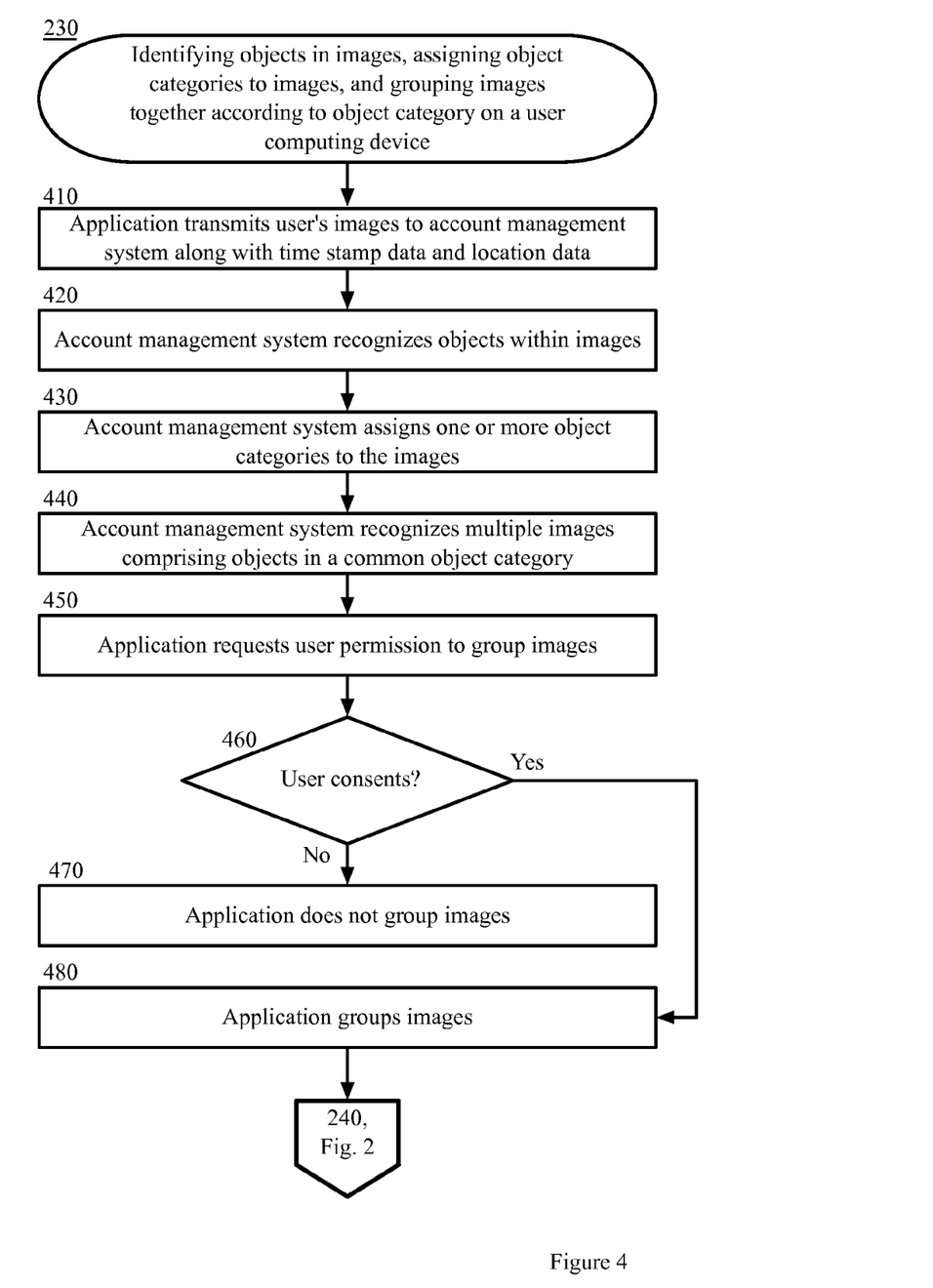
FIG. 4 is a block flow diagram depicting a method for identifying objects in images, assigning object categories to images, and grouping images together according to object category on a user computing device, in accordance with certain example embodiments.

FIG. 4 is a block flow diagram depicting a method 230 for identifying objects in images, assigning object categories to images, and grouping images together according to object category on a user computing device 110, in accordance with certain example embodiments, as referenced in block 230. The method 230 is described with reference to the components illustrated in FIG. 1.

In block 410, the application 113 transmits the user's 101 images to the account management system 130 with time stamp data and location data associated therewith. In an example embodiment, signing in to the application 113 allows the account management system 130 access to the images on the user computing device 110. In another example embodiment, the user 101 configures the settings on the application 113 or otherwise allows the account management system 130 access to the images on the user computing device 110. In certain embodiments, the functions of method 230 are performed on the user computing device 110.

In block 420, the account management system 130 recognizes objects within the images. In an example embodiment, the account management 130 uses an object recognition algorithm to determine objects or regions of interest in the images and to identify the type or types of objects in the image. For example, in a captured image of a framed painting on a wall, the painting, the frame, the framed painting, or the wall may be recognized objects within the image, as well as furniture located in front of the wall.

In block 430, the account management system 130 assigns one or more object categories to the images based on objects within the images. For example, an object category is a label describing an object. In an example embodiment, the specificity of object category labels varies. For example, the object category for a leather office swivel chair may comprise leather office chair, leather chair, leather swivel chair, office furniture, furniture, chair, swivel chair, leather furniture, leather office furniture, or any other more specific or general terms appropriate to describing the object in the captured image. In an example embodiment, the account management system 130 does not assign an object category to every recognized object in an image. For example, with an image of a framed picture on a wall, the account management system 130 may assign an object category to the frame, the picture, or the framed picture, but may not assign an object category to the wall.

In block 440, the account management system 130 recognizes multiple images comprising objects in a common object category. In an example embodiment, the account management system 130 can read the assigned object category labels of the images, determine whether two or more images have a same object category label, and group the images together by common object category label. For example, the user 101 captured a first image of a leather office swivel chair, a second image of a leather office straight backed chair, and a third image of a fabric cushion office chair. In this example, the account management system 130 may recognize "office chair" or "chair" as the common object category of the three images captured by the user computing device 110.

In block 450, the application 113 requests user 101 permission to group the images. In an example embodiment, the user 101 is presented with selectable user interface 111 objects that enable the user 101 to consent or to deny consent to the application 113 request. In another example embodiment, the user 101 may request that the application 113 wait and ask for user 101 permission at a later time. For example, the account management system 130 finds three images with the category label "office chair." In this example, the application 113 presents a popup menu on the user interface 111 that reads, "Would you like to group your office chair pictures?" In this example, the user 101 may click a "yes" box, a "no" box, or an "ask me later" box in the user interface control. In another example embodiment, the user 101 may select never to be asked to group images in this object category again. In yet another example embodiment, the user 101 configures the application 113 settings so that the application 113 does not need to ask user 101 permission to group images and can group images automatically as they are captured by the user computing device 110. In this same example embodiment, the user 101 may de-configure the settings at any time so that the application 113 is not granted permission to group images. In other example embodiments, the application 113 does not request user 101 permission to group the images and proceeds to group the images. In yet another example embodiment, the user 101 may select to ungroup the images if the user 101 is not satisfied with the image grouping. For example, the user 101 may actuate a user interface 111 object that reads "ungroup images" that, when actuated, causes the application 113 to ungroup the images in the object category group.

In block 460, if required, the user 101 chooses either to consent or not to consent to the application's 113 request to group the images. In certain example embodiments, the application 113 and/or account management system 130 may make the grouping of images contingent upon user 101 consent. In this example embodiment, the user 101 expresses consent or refusal to consent by some appropriate action at the user interface 111. For example, the user 101 expresses his consent or his refusal to consent by actuating a user interface object 111 on the user computing device 110.

In an example embodiment in which the grouping of images is contingent upon user 101 consent, if the user 101 does not consent, the method 230 proceeds to block 470, and the application 113 does not group the images. In an example embodiment, the application 113 waits until the user computing device 110 captures another image and the account management system 130 assigns an object category group to that image in common with one or more other images on the user computing device 110 before asking permission to group images again. In another example embodiment, the application 113 does not ask the user 101 to group images with this common object category label again.

Returning to block 460, if the user 101 consents, the method 230 proceeds to block 480, and the application 113 groups the images. In an example embodiment, the group of images may be saved in a folder on the data storage device 114. In another example embodiment, the group of images may be clustered together within a larger group of images on the data storage device 114. In yet another example embodiment, the application 113 transmits the images to the account management system 130 and the images are grouped and saved by the account management system 130. In this example embodiment, the application 113 communicates with the account management system 130 to retrieve the group of images when the group of images are presented on the user computing device 110. In an example embodiment, the user 101 may find the group of images with the common object category label using the application 113. In an example embodiment, the images are grouped in such a way that the user 101 can access the group of images and that it is apparent to the user 101 that the images are grouped based on the common object category. In an example embodiment, the application 113 may present the object category label, the user 101 selects the object category label, the application 113 searches for images labeled with the object category label, and the application 113 may present those images as a group along with the object category label.

The method 230 then proceeds to block 240 in FIG. 2.

Returning to FIG. 2, in block 240, a new image is captured and added to an existing object category group. The method for capturing a new image and saving it to an existing object category group is described in more detail hereinafter with reference to the methods described in FIG. 5.

Figure 5:
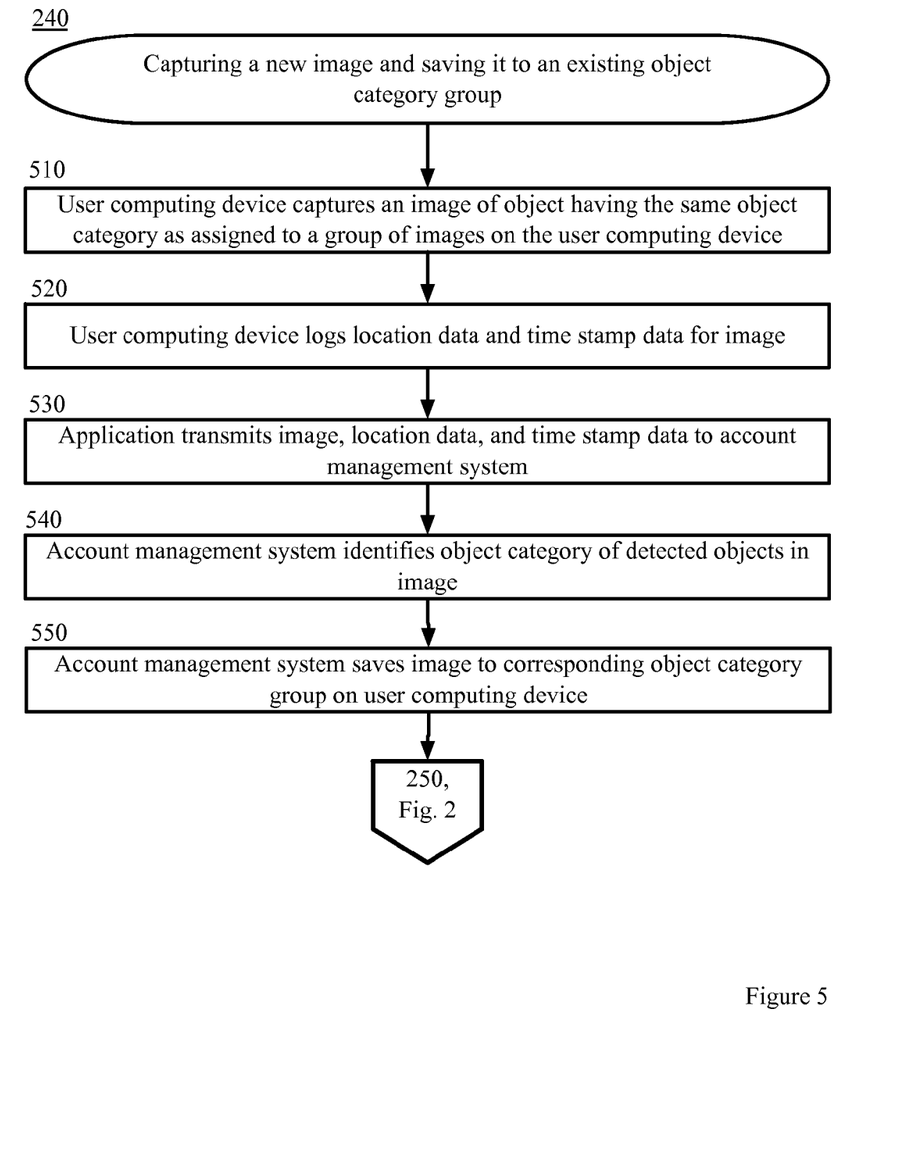
FIG. 5 is a block flow diagram depicting a method for capturing a new image and saving it to an existing object category group, in accordance with certain example embodiments.

FIG. 5 is a block flow diagram depicting a method 240 for capturing a new image and saving it to an existing object category group, in accordance with certain example embodiments, as referenced in block 240. The method 240 is described with reference to the components illustrated in FIG. 1.

In block 510, the user computing device 110 captures an image of an object having the same object category as assigned to a group of images on the user computing device 110. In an example embodiment, the user 101 accesses the camera module 112 on the user computing device 110. In an example embodiment, the user 101 changes settings on the camera module 112 and/or the user computing device 110 before capturing the image. For example, the user 101 activates the flash setting on the camera module 112. In another example embodiment, the user 101 captures multiple images of the desired object. In yet another example embodiment, the user 101 records a video of the desired object using the camera module 112.

In an optional embodiment, in block 520, the user computing device 110 logs location data and time stamp data for the image. In an example embodiment, the user computing device 110 utilizes the global positioning system (GPS) to log the approximate longitude and latitude of the user computing device 110. In another example embodiment, the user computing device 110 uses another satellite-based positioning system to log the location data. In yet another example embodiment, the user computing device 110 calculates the distance of the user computing device 110 from the nearest radio towers or cell towers to determine its position. In an example embodiment, the user computing device 110 correlates the location with an address. For example, the user computing device 110 enters the location in a mapping application 113 on the user computing device 110 or transmits the location to the account management system 130 to receive an address associated with the location. In an example embodiment, the time stamp comprise one or more of the current month, day, year, era, time zone, hour of the day, minutes of the hour, and seconds of the minute. For example, a time stamp comprises 9:30 a.m. ET, Dec. 27, 2013. In another example embodiment, the user computing device 110 does not log location data for the image. For example, the user 101 has not enabled or has disabled the user computing device's 110 ability to log location data. In another example, the user 101 has not granted permission or has withdrawn permission for the user computing device 110 to log the location data. In yet another example embodiment, the user computing device 110 does not log time stamp data for the image.

In block 530, the application 113 transmits the image, location data, and time stamp data to the account management system 130. In an example embodiment, the image is saved on the user computing device 110 before it is transmitted to the account management system 130. In another example embodiment, the image is saved on another device accessible by the user computing device 110 over a network 120. In an example embodiment, the user 101 is signed in to the application 113, allowing the account management system 130 access to the images on the user computing device 110. In another example embodiment, the user 101 configures the settings on the application 113 or otherwise allows the account management system 130 access to the images on the user computing device 110.

In block 540, the account management system identifies the object category of detected objects in the image. In an example embodiment, the account management system 130 recognizes objects within the images. For example, the account management system 130 uses an object recognition algorithm to identify objects or regions of interest in the images. In an example embodiment, the account management system 130 assigns one or more object categories to the image based on objects within the image. For example, an object category is a label describing an object. In an example embodiment, the specificity of object category labels varies. For example, the object category for a leather office swivel chair may comprise leather office chair, leather chair, leather swivel chair, office furniture, furniture, chair, swivel chair, leather furniture, leather office furniture, or any other more specific or general terms appropriate to describing the object in the captured image. In an example embodiment, the account management system 130 does not assign an object category to every recognized object in an image. For example, with an image of a framed picture on a wall, the account management system 130 may assign an object category to the frame, the picture, or the framed picture, but may not assign an object category to the wall.

In block 550, the account management system 130 saves the image to the corresponding object category group on the user computing device 110. In an example embodiment, the account management system 130 recognizes that the image has the same assigned object category label as an object category group on the user computing device 110.

In an example embodiment, because the user 101 gave permission to group images on the user computing device 110 when the object category groups were created on the user computing device, the account management system 130 does not need permission to save the image to the object category group on the user computing device 110.

In another example embodiment, the account management system 130 transmits a request for user 101 permission to add the image to an object category group on the user computing device 110, the request is displayed for the user 101, and the user 101 may consent or deny consent to the request. For example, the account management system 130 transmits a permission request to the user computing device 110, which displays a request to the user 101 saying "would you like to group image 'x' in group 'y'?" In this example, the user 101 actuates a user interface 111 object to consent to the request. In an example embodiment, the image is saved in a folder on the data storage device 114 comprising a group of images in an existing object category group.

In another example embodiment, the image is clustered with an existing cluster of images of the same object category group within a larger group of images on the data storage device 114. In an example embodiment, the user 101 may find the image (and the other images in the object category group) using the application 113. In an example embodiment, the images are grouped in such a way that the user 101 can access the group of images and it is apparent to the user 101 that the images are grouped based on the common object category.

In an example embodiment, the account management system 130 modifies the object category label of a group of images when adding a subsequent image to an existing group. For example, there are three images in the object category group "office chair" and the subsequent image has the object category label "office desk." In this example, the account management system 130 renames the existing group of images "office furniture" and adds the subsequent image to the "office furniture" group.

The method 240 then proceeds to block 250 in FIG. 2.

Returning to FIG. 2, in block 250, the account management system 130 provides information corresponding to each image in the object category group associated with the new image. The method for finding and transmitting information to the user computing device 110 corresponding to each image in the object category group associated with the new captured image is described in more detail hereinafter with reference to the methods described in FIG. 6. In certain example embodiments, the application 113 and/or account management system 130 finds information corresponding to each image in an object category group in response to an initial grouping of images in object category groups. In other example embodiments, the application 113 and/or account management system 130 find the information in response to the user computing device 110 capturing a subsequent image identified by the account management system 130 as corresponding to an existing object category group of images on the user computing device 110.

Figure 6:
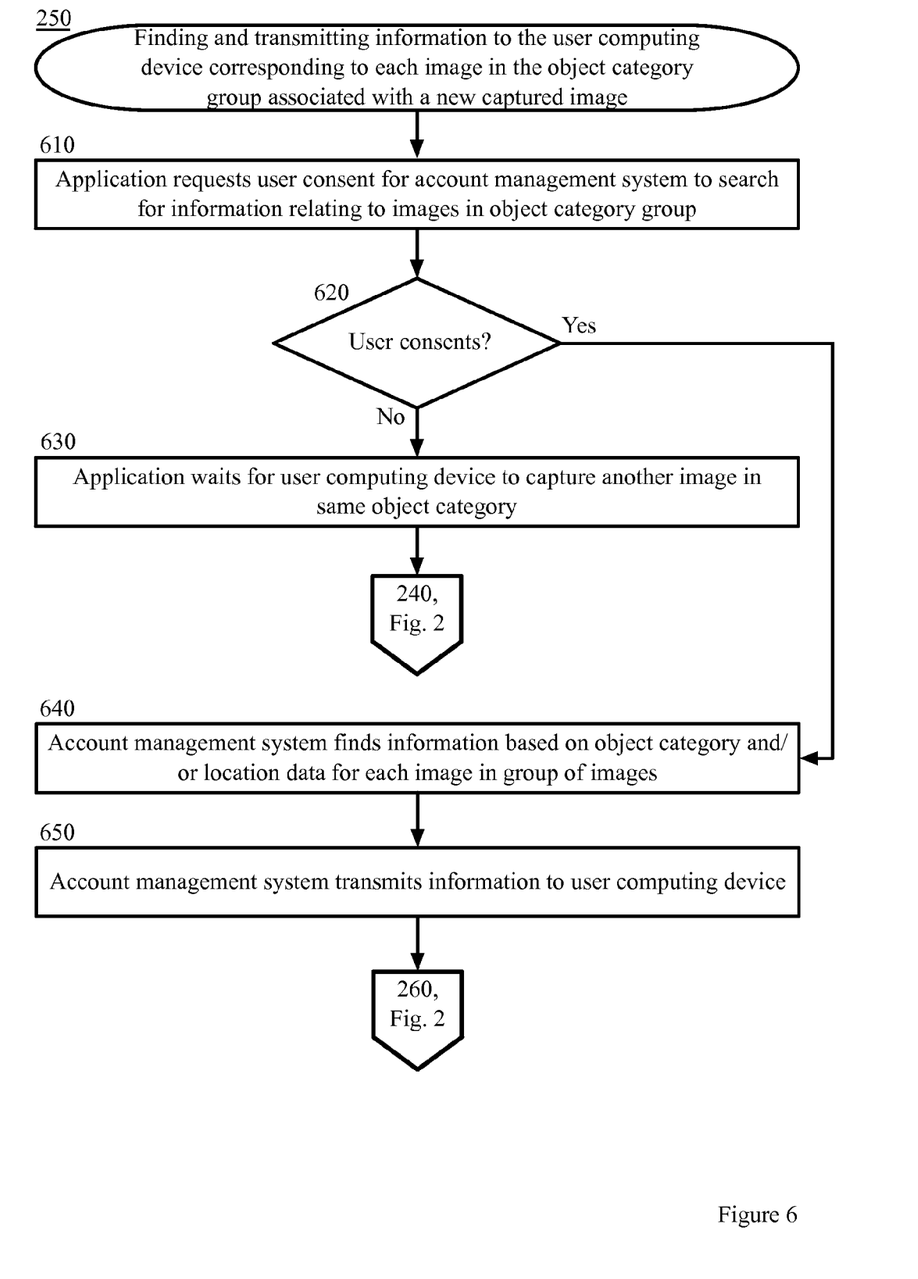
FIG. 6 is block flow diagram depicting a method for finding and transmitting information to a user computing device corresponding to each image in the object category group associated with a new captured image, in accordance with certain example embodiments.

FIG. 6 is a block flow diagram depicting a method 250 for finding and transmitting information to the user computing device 110 corresponding to each image in the object category group associated with a new captured image.

In block 610, the application 113 requests user 101 consent for the account management system 130 to search for information relating to images in an object category group. In an example embodiment, the user computing device 110 displays the request in a popup window on the user interface 111. For example, the user 101 reads a request that says, "would you like us to search for office chairs?" In an example embodiment, the request is sent in response to a subsequent image being added to an existing object category group on the user computing device 110. For example, a user 101 capturing a subsequent image that is given the same or similar object category label by the account management system 130 may indicate that the user 101 is interested in receiving information about the images in the object category group. In an example embodiment, the request to search for information is a request to find shopping information, such as prices for the products in the images, similar products for sale, locations to buy products, or prices of competing products. In certain example embodiments, the application 113 does not request user 101 consent for the account management system 130 to search for information relating to images in an object category group. In an example embodiment, the user 101 configures the settings of the application 113 so that the application automatically allows the account management system 130 to search for information.

In block 620, the user 101 decides whether to consent or not consent to the application's 113 request. In an example embodiment, the user 101 has the option to actuate various user interface 111 objects in order to consent or to not consent. In an example, the user 101 may select "yes" to consent, "no" not to consent, or "ask me later" for the application 113 to repeat the request at a later time.

In an example embodiment, if the user 101 does not consent to the application's 113 request, the method 250 proceeds to block 630, and the application 113 waits for the user computing device 110 to capture another image in the same object category. In an example embodiment, the application 113 waits until the user computing device 110 captures another image and the account management system 130 assigns an object category group to that image in common with an existing category group on the user computing device 110 before asking permission to search for information again.

In an example embodiment, the method 250 proceeds to block 240 in FIG. 2, where a new image is captured and added to an existing object category group.

Returning to block 620, in FIG. 6, if the user 101 consents to the application's 113 request, the method 250 proceeds to block 640, and the account management system 130 finds information based on the object category and/or location data for each image in a group of images. In an example embodiment, the location data for each image in the group of images may be used to identify a merchant associated with the location and object within an image. In an example embodiment, the user computing device 110 finds shopping information for each image in the group of images. In an example embodiment, the information comprises a set of options for purchasing the objects in the images. For example, for each image, the information may comprise prices for the object in the image, the prices for one or more competing products, and links to websites to purchase the object and/or competing products. In another example, the information comprises a list of links the user 101 may select to purchase or find more information about products. In this example, the links may be ranked by distance of merchant location from the user 101, by price, by estimated time of delivery, or by any other useful or relevant ranking criteria. In an example embodiment, the account management system 130 has the information for each image in the group of images. In another example embodiment, the information further comprises information related to each image in the group of images. For example, in addition to offering a list of links the user 101 may select to purchase the products associated with the images, the account management system 130 also offers links to purchase related products of which the user 101 may have interest. In another example, the user computing device 110 can input the object category label and/or individual object category labels for each image in a group as search terms into a search engine. The search engine then performs a query using the search terms to identify information related to the objects in the grouped images. In another example embodiment, the account management system 130 searches for this information from other systems or entities over a network 120 or finds the information by some other appropriate means.

In block 650, the account management system 130 transmits the information to the user computing device 110. In an example embodiment, the account management system 130 transmits the information via the network 120 to the application 113. In another example embodiment, the account management transmits the information to the user computing device 110 via email, text message, or any other means by which the information may arrive on the user computing device 110.

The method 250 then proceeds to block 260 in FIG. 2.

Returning to FIG. 2, in block 260, the user computing device 110 receives the information. In an example embodiment, the user computing device 110 receives the information on an email application, via text message, or via the application 113. In another example embodiment, the user computing device 110 receives the information via the web browser 116. In another example embodiment, the user computing device 110 does not receive the information until after the account management system 130 correlates the information to each image in the object category group.

In block 270, the user computing device 110 correlates the information to each image in the object category group. For example, the account management system 130 finds pricing information for products represented by three images in an object category group. In this example, the account management system 130 identifies the three images along with three prices corresponding to the three images when it transmits the information to the user computing device 110. In this example, the user computing device 110 associates each price received from the account management system with an image in the object category group. In another example embodiment, the account management system 130 correlates the information to each image in the object category group and then transmits the information to the user computing device 110. In an example embodiment, the user 101 may transmit a request to the account management system 130 for more information concerning the images in the object category group. In another example embodiment, the information may include links that the user 101 may click to redirect the web browser 116 to a website containing information about one or more of the images in the object category group.

In block 280, the application 113 displays each image in the object category group with corresponding information on the user computing device 110. In an example embodiment, the user computing device 110 application 113 displays the images in the object category group and corresponding information on the user interface 111. In an example embodiment, the information corresponding to each image is displayed so that the user 101 can associate each image with its corresponding information. For example, each image may be a user interface 111 object. In this example, the user 101 actuates each user interface 111 object image to access information corresponding to each image. In another example, the application displays the images in a tabular format, wherein the each image is displayed alongside information corresponding to that image.

Other Example Embodiments

Figure 7:
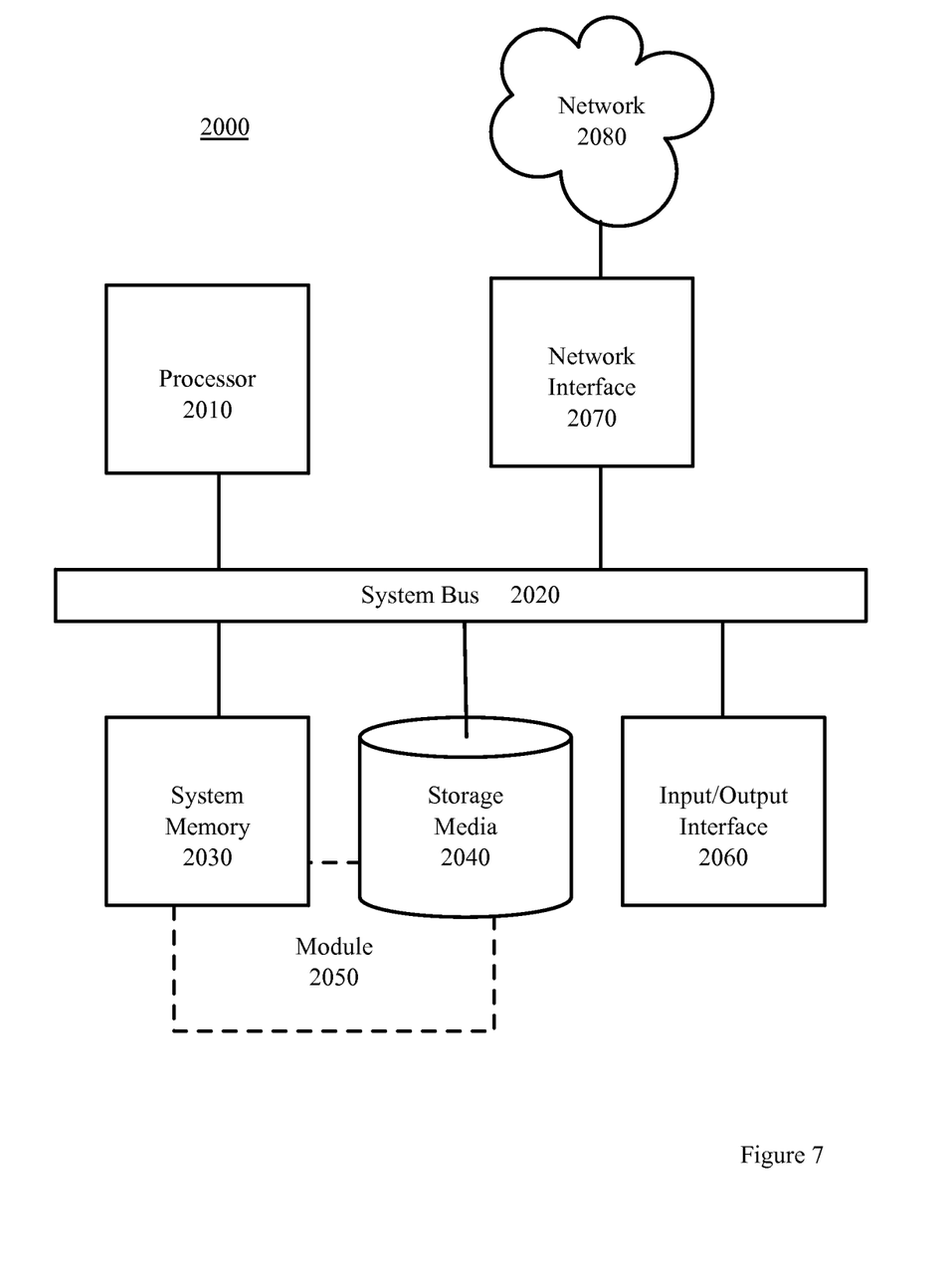
FIG. 7 is a block diagram depicting a computer machine and module, in accordance with certain example embodiments.

FIG. 7 depicts a computing machine 2000 and a module 2050 in accordance with certain example embodiments. The computing machine 2000 may correspond to any of the various computers, servers, mobile devices, embedded systems, or computing systems presented herein. The module 2050 may comprise one or more hardware or software elements configured to facilitate the computing machine 2000 in performing the various methods and processing functions presented herein. The computing machine 2000 may include various internal or attached components such as a processor 2010, system bus 2020, system memory 2030, storage media 2040, input/output interface 2060, and a network interface 2070 for communicating with a network 2080.

The computing machine 2000 may be implemented as a conventional computer system, an embedded controller, a laptop, a server, a mobile device, a smartphone, a set-top box, a kiosk, a vehicular information system, one more processors associated with a television, a customized machine, any other hardware platform, or any combination or multiplicity thereof. The computing machine 2000 may be a distributed system configured to function using multiple computing machines interconnected via a data network or bus system.

The processor 2010 may be configured to execute code or instructions to perform the operations and functionality described herein, manage request flow and address mappings, and to perform calculations and generate commands. The processor 2010 may be configured to monitor and control the operation of the components in the computing machine 2000. The processor 2010 may be a general purpose processor, a processor core, a multiprocessor, a reconfigurable processor, a microcontroller, a digital signal processor ("DSP"), an application specific integrated circuit ("ASIC"), a graphics processing unit ("GPU"), a field programmable gate array ("FPGA"), a programmable logic device ("PLD"), a controller, a state machine, gated logic, discrete hardware components, any other processing unit, or any combination or multiplicity thereof. The processor 2010 may be a single processing unit, multiple processing units, a single processing core, multiple processing cores, special purpose processing cores, co-processors, or any combination thereof. According to certain embodiments, the processor 2010 along with other components of the computing machine 2000 may be a virtualized computing machine executing within one or more other computing machines.

The system memory 2030 may include non-volatile memories such as read-only memory ("ROM"), programmable read-only memory ("PROM"), erasable programmable read-only memory ("EPROM"), flash memory, or any other device capable of storing program instructions or data with or without applied power. The system memory 2030 may also include volatile memories such as random access memory ("RAM"), static random access memory ("SRAM"), dynamic random access memory ("DRAM"), and synchronous dynamic random access memory ("SDRAM"). Other types of RAM also may be used to implement the system memory 2030. The system memory 2030 may be implemented using a single memory module or multiple memory modules. While the system memory 2030 is depicted as being part of the computing machine 2000, one skilled in the art will recognize that the system memory 2030 may be separate from the computing machine 2000 without departing from the scope of the subject technology. It should also be appreciated that the system memory 2030 may include, or operate in conjunction with, a non-volatile storage device such as the storage media 2040.

The storage media 2040 may include a hard disk, a floppy disk, a compact disc read only memory ("CD-ROM"), a digital versatile disc ("DVD"), a Blu-ray disc, a magnetic tape, a flash memory, other non-volatile memory device, a solid state drive ("SSD"), any magnetic storage device, any optical storage device, any electrical storage device, any semiconductor storage device, any physical-based storage device, any other data storage device, or any combination or multiplicity thereof. The storage media 2040 may store one or more operating systems, application programs and program modules such as module 2050, data, or any other information. The storage media 2040 may be part of, or connected to, the computing machine 2000. The storage media 2040 may also be part of one or more other computing machines that are in communication with the computing machine 2000 such as servers, database servers, cloud storage, network attached storage, and so forth.

The module 2050 may comprise one or more hardware or software elements configured to facilitate the computing machine 2000 with performing the various methods and processing functions presented herein. The module 2050 may include one or more sequences of instructions stored as software or firmware in association with the system memory 2030, the storage media 2040, or both. The storage media 2040 may therefore represent examples of machine or computer readable media on which instructions or code may be stored for execution by the processor 2010. Machine or computer readable media may generally refer to any medium or media used to provide instructions to the processor 2010. Such machine or computer readable media associated with the module 2050 may comprise a computer software product. It should be appreciated that a computer software product comprising the module 2050 may also be associated with one or more processes or methods for delivering the module 2050 to the computing machine 2000 via the network 2080, any signal-bearing medium, or any other communication or delivery technology. The module 2050 may also comprise hardware circuits or information for configuring hardware circuits such as microcode or configuration information for an FPGA or other PLD.

The input/output ("I/O") interface 2060 may be configured to couple to one or more external devices, to receive data from the one or more external devices, and to send data to the one or more external devices. Such external devices along with the various internal devices may also be known as peripheral devices. The I/O interface 2060 may include both electrical and physical connections for operably coupling the various peripheral devices to the computing machine 2000 or the processor 2010. The I/O interface 2060 may be configured to communicate data, addresses, and control signals between the peripheral devices, the computing machine 2000, or the processor 2010. The I/O interface 2060 may be configured to implement any standard interface, such as small computer system interface ("SCSI"), serial-attached SCSI ("SAS"), fiber channel, peripheral component interconnect ("PCI"), PCI express (PCIe), serial bus, parallel bus, advanced technology attached ("ATA"), serial ATA ("SATA"), universal serial bus ("USB"), Thunderbolt, FireWire, various video buses, and the like. The I/O interface 2060 may be configured to implement only one interface or bus technology. Alternatively, the I/O interface 2060 may be configured to implement multiple interfaces or bus technologies. The I/O interface 2060 may be configured as part of, all of, or to operate in conjunction with, the system bus 2020. The I/O interface 2060 may include one or more buffers for buffering transmissions between one or more external devices, internal devices, the computing machine 2000, or the processor 2010.

The I/O interface 2060 may couple the computing machine 2000 to various input devices including mice, touch-screens, scanners, electronic digitizers, sensors, receivers, touchpads, trackballs, cameras, microphones, keyboards, any other pointing devices, or any combinations thereof. The I/O interface 2060 may couple the computing machine 2000 to various output devices including video displays, speakers, printers, projectors, tactile feedback devices, automation control, robotic components, actuators, motors, fans, solenoids, valves, pumps, transmitters, signal emitters, lights, and so forth.

The computing machine 2000 may operate in a networked environment using logical connections through the network interface 2070 to one or more other systems or computing machines across the network 2080. The network 2080 may include wide area networks (WAN), local area networks (LAN), intranets, the Internet, wireless access networks, wired networks, mobile networks, telephone networks, optical networks, or combinations thereof. The network 2080 may be packet switched, circuit switched, of any topology, and may use any communication protocol. Communication links within the network 2080 may involve various digital or an analog communication media such as fiber optic cables, free-space optics, waveguides, electrical conductors, wireless links, antennas, radio-frequency communications, and so forth.

The processor 2010 may be connected to the other elements of the computing machine 2000 or the various peripherals discussed herein through the system bus 2020. It should be appreciated that the system bus 2020 may be within the processor 2010, outside the processor 2010, or both. According to some embodiments, any of the processor 2010, the other elements of the computing machine 2000, or the various peripherals discussed herein may be integrated into a single device such as a system on chip ("SOC"), system on package ("SOP"), or ASIC device.

In situations in which the systems discussed here collect personal information about users, or may make use of personal information, the users may be provided with an opportunity or option to control whether programs or features collect user information (e.g., information about a user's social network, social actions or activities, profession, a user's preferences, or a user's current location), or to control whether and/or how to receive content from the content server that may be more relevant to the user. In addition, certain data may be treated in one or more ways before it is stored or used, so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, the user may have control over how information is collected about the user and used by a content server.

Embodiments may comprise a computer program that embodies the functions described and illustrated herein, wherein the computer program is implemented in a computer system that comprises instructions stored in a machine-readable medium and a processor that executes the instructions. However, it should be apparent that there could be many different ways of implementing embodiments in computer programming, and the embodiments should not be construed as limited to any one set of computer program instructions. Further, a skilled programmer would be able to write such a computer program to implement an embodiment of the disclosed embodiments based on the appended flow charts and associated description in the application text. Therefore, disclosure of a particular set of program code instructions is not considered necessary for an adequate understanding of how to make and use embodiments. Further, those skilled in the art will appreciate that one or more aspects of embodiments described herein may be performed by hardware, software, or a combination thereof, as may be embodied in one or more computing systems. Moreover, any reference to an act being performed by a computer should not be construed as being performed by a single computer as more than one computer may perform the act.

The example embodiments described herein can be used with computer hardware and software that perform the methods and processing functions described herein. The systems, methods, and procedures described herein can be embodied in a programmable computer, computer-executable software, or digital circuitry. The software can be stored on computer-readable media. For example, computer-readable media can include a floppy disk, RAM, ROM, hard disk, removable media, flash memory, memory stick, optical media, magneto-optical media, CD-ROM, etc. Digital circuitry can include integrated circuits, gate arrays, building block logic, field programmable gate arrays (FPGA), etc.

The example systems, methods, and acts described in the embodiments presented previously are illustrative, and, in alternative embodiments, certain acts can be performed in a different order, in parallel with one another, omitted entirely, and/or combined between different example embodiments, and/or certain additional acts can be performed, without departing from the scope and spirit of various embodiments. Accordingly, such alternative embodiments are included in the invention claimed herein.

Although specific embodiments have been described above in detail, the description is merely for purposes of illustration. It should be appreciated, therefore, that many aspects described above are not intended as required or essential elements unless explicitly stated otherwise. Modifications of, and equivalent components or acts corresponding to, the disclosed aspects of the example embodiments, in addition to those described above, can be made by a person of ordinary skill in the art, having the benefit of the present disclosure, without departing from the spirit and scope of embodiments defined in the following claims, the scope of which is to be accorded the broadest interpretation so as to encompass such modifications and equivalent structures.

What is claimed is:

1. A computer-implemented method to organize digital images based on objects detected in images, comprising:
receiving, using one or more computing devices, a set of images, wherein the images are captured by a computing device operated by a user, the set of images comprising location data corresponding to each image of the set of images, wherein the location data is identified by the computing device operated by the user;
identifying, using the one or more computing devices, one or more objects within each image of the set of images;
assigning, using the one or more computing devices, one or more object category labels to each image of the set of images based on the one or more objects identified within each image and based on the location data corresponding to each image;

for each assigned object category label:
  detecting, using the one or more computing devices, two or more images within the set of images having the particular assigned object category label;
  grouping, using the one or more computing devices and in response to detecting the two or more images within the set of images having the particular assigned object category label, the two or more detected images;

transmitting, using the one or more computing devices and to the computing device operated by the user, an organized set of images, wherein the organized set of images comprises the set of images arranged in groups of two or more images, each group comprising images assigned a respective particular object category label;

receiving, using the one or more computing devices and from the computing device operated by the user, a request to find information for a group of two or more images having a common object category label;

identifying, using the one or more computing devices, information relating to each image of the group of two or more images having a common object category label;

organizing, using the one or more computing devices, the information to correspond to each image of the group of two or more images having a common object category label; and transmitting, using the one or more computing devices and to the computing device operated by the user, the organized information.

2. The method of claim 1, further comprising:

receiving, using the one or more computing devices and from the computing device operated by the user, one or more subsequent images, wherein the one or more subsequent images are captured by the computing device operated by the user;

identifying, using the one or more computing devices, one or more objects within each image of one or more subsequent images;

assigning, using the one or more computing devices, one or more object category labels to each image of the one or more subsequent images based on the one or more objects identified within each subsequent image;

detecting, using the one or more computing devices, that one or more of the subsequent images has one or more of the same object category labels as a group of two or more images with a particular assigned category label within the organized set of images;

adding, using the one or more computing devices, the one or more of the subsequent images to the group comprising the two or more images assigned the particular assigned object category label within the organized set of images;

transmitting, using the one or more computing devices and to the computing device operated by the user, a request for consent to find information related to each image of the group of images corresponding to the particular assigned object category label of one or more of the subsequent images;

receiving, using the one or more computing devices and from the computing device operated by the user, a user consent to find information;

identifying, using the one or more computing devices, information relating to each image of the group of images corresponding to the object category label of one or more of the subsequent images;

organizing, using the one or more computing devices, the information to correspond to each image of the group of images corresponding to the object category label of one or more of the subsequent images; and transmitting, using the one or more computing devices and to the computing device operated by the user, the organized information.

3. The method of claim 2, further comprising receiving, using the one or more computing devices, location data corresponding to each image of the one or more subsequent images, wherein the location data is captured by the computing device operated by the user.

4. The method of claim 3, wherein assigning the one or more object category labels is further based on the location data corresponding to each image.

5. The method of claim 1, wherein the information relating to each image of the group of one or more images having a common object category label comprises a price and availability for the object within the image at a merchant associated with the location data.

6. The method of claim 1, wherein the information comprises a set of options for purchasing one or more products associated with the one or more objects in each image in the set of images.

7. The method of claim 1, wherein the information comprises a set of hyperlinks to one or more merchants offering one or more products associated with the one or more objects in each image in the set of images for purchase.

8. The method of claim 1, further comprising, receiving, using the one or more computing devices and from the computing device, time stamp data corresponding to each image of the set of images, wherein the time stamp data is identified by the computing device operated by the user, and wherein grouping the one or more detected images within the set of images having a common object category label is based on the time stamp data.

9. A computer program product, comprising:
  a non-transitory computer-readable medium having computer-executable program instructions embodied thereon that when executed by a computer cause the computer to organize digital images based on objects detected in images, the computer-executable program instructions comprising:
    computer-executable program instructions to receive a set of images captured by a computing device operated by a user, the set of images comprising location data corresponding to each image of the set of images, wherein the location data is identified by the computing device operated by the user;
    computer-executable program instructions to identify one or more objects within each image of the set of images;
    computer-executable program instructions to assign one or more object category labels to each image of the set of images based on the one or more objects identified within each image and based on the location data corresponding to each image;
    for each assigned object category label:
      computer-executable program instructions to detect two or more images within the set of images having the particular assigned object category label;
      computer-executable program instructions to group the two or more detected images in response to detecting the two or more images within the set of images having the particular assigned object category label;

computer-executable program instructions to transmit, to the computing device operated by the user, an organized set of images, wherein the organized set of images comprises the set of images arranged in groups of two or more images, each group comprising images assigned a respective particular object category label;

computer-executable program instructions to receive, from the computing device operated by the user, a request to find information for a group of two or more images having a common object category label;

computer-executable program instructions to identify information relating to each image of the group of two or more images having a common object category label;

computer-executable program instructions to organize the information to correspond to each image of the group of two or more images having a common object category label; and computer-executable program instructions to transmit, to the computing device operated by the user, the organized information.

10. The computer program product of claim 9, further comprising:

computer-executable program instructions to receive, from the computing device operated by the user, one or more subsequent images, wherein the one or more subsequent images are captured by the computing device operated by the user;

computer-executable program instructions to identify one or more objects within each image of one or more subsequent images;

computer-executable program instructions to assign one or more object category labels to each image of the one or more subsequent images based on the one or more objects identified within each subsequent image;

computer-executable program instructions to detect that one or more of the subsequent images has one or more of the same object category labels as a group of one or more images with a particular assigned category label within the organized set of images;

computer-executable program instructions to add the one or more of the subsequent images to the group comprising the two or more images assigned the particular assigned object category label within the organized set of images to update the organized set of images;

computer-executable program instructions to identify information relating to each image of the group of images corresponding to the object category label of one or more of the subsequent images;

computer-executable program instructions to organize the information to correspond to each image of the group of images corresponding to the object category label of one or more of the subsequent images; and computer-executable program instructions to transmit, to the computing device operated by the user, the updated organized set of images comprising the organized information.

11. The computer program product of claim 9, further comprising computer-executable program instructions to receive location data corresponding to each image of the one or more subsequent images, wherein the location data is identified by the computing device operated by the user.

12. A system to organize digital images based on objects detected in images, comprising:
a storage device; and a processor communicatively coupled to the storage device, wherein the processor executes application code instructions that are stored in the storage device to cause the system to:
receive a set of images, wherein the images are captured by a computing device operated by a user;
identify one or more objects within each image of the set of images;
assign one or more object category labels to each image of the set of images based on the one or more objects identified within each image;
for each assigned object category label:
detect two or more images within the set of images having the particular assigned object category label;
group the two or more detected images in response to detecting the two or more images within the set of images having the particular assigned object category label;
transmit, to the computing device operated by the user, an organized set of images, wherein the organized set of images comprises the set of images arranged in groups of two or more images, each group comprising images assigned a respective particular object category label;
identify information relating to each image of a group of two or more images having a common object category label;
organize the information to correspond to each image of the group of two or more images having a common object category label; and
transmit, to the computing device operated by the user, the organized information.

13. The system of claim 12, wherein the processor is further configured to execute computer-executable instructions stored in the storage medium to cause the system to:
receive, from the computing device operated by the user, one or more subsequent images, wherein the one or more subsequent images are captured by the computing device operated by the user;
identify one or more objects within each image of one or more subsequent images;
assign one or more object category labels to each image of the one or more subsequent images based on the one or more objects identified within each subsequent image;
detect that one or more of the subsequent images has one or more of the same object category labels as a group of one or more images with a particular assigned category label within the organized set of images;
add the one or more of the subsequent images to the group comprising the two or more images assigned the particular assigned object category label within the organized set of images to update the organized set of images; and
transmit the updated organized set of images to the computing device operated by the user.

14. The system of claim 13, wherein the processor is further configured to execute computer-executable instructions stored in the storage medium to cause the system to:
transmit, to the computing device operated by the user, a request for consent to find information related to each image of the group of images corresponding to the object category label of one or more of the subsequent images, wherein the user consents to find information;
receive, from the computing device operated by the user, a user consent to find information;

identify information relating to each image of the group of images corresponding to the object category label of one or more of the subsequent images;

organize the information to correspond to each image of the group of images corresponding to the object category label of one or more of the subsequent images; and transmit, to the computing device operated by the user, the organized information.

* * * * *